Feb. 1, 1949.   P. D. WURZBURGER   2,460,668
FITTING
Filed Oct. 18, 1944

INVENTOR.
PAUL D. WURZBURGER.
BY

Patented Feb. 1, 1949

2,460,668

UNITED STATES PATENT OFFICE 2,460,668

FITTING

Paul D. Wurzburger, Cleveland Heights, Ohio

Application October 18, 1944, Serial No. 559,172

5 Claims. (Cl. 285—115)

This invention relates to the art of capillary joints and fittings and more particularly to improvements in the socket parts of capillary joints in which tubes or members are received telescopically and provide with the socket parts a capillary space into which a bonding material such as solder is introduced and distributed by capillary action.

Aspects of the problem to which my invention is addressed are discussed in my copending applications for Letters Patent of the United States, including Serial Numbers 544,061 and 548,327 filed July 8, 1944 and August 7, 1944 respectively. Related subject matter is claimed therein. This application is a continuation in part of my said copending application Serial No. 544,061. Reference is also made to my copending application Serial No. 559,171 in which related subject matter is contained.

It is among the objects of my invention to improve the feeding, distribution and bonding of the bonding material such as solder to and within the capillary space between the socket and tube or member to be engaged therein.

Another object is to provide the socket part of a capillary fitting with means for guiding and heating bonding material such as a solder rod, efficiently, and inducing a rapid and proper melting and flow of molten solder into the capillary space. Another object is to bring heat to the solder adjacent its point of introduction to the capillary joint in ample rate and amount to melt and transport the solder most efficiently into and throughout the joint.

Figure 1:
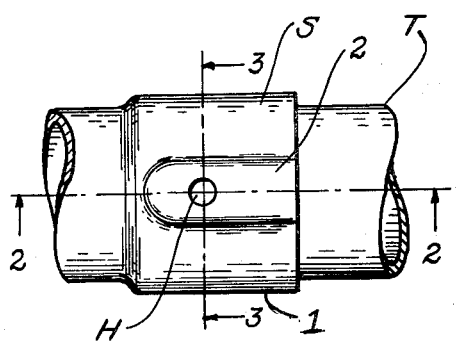
Figure 2:
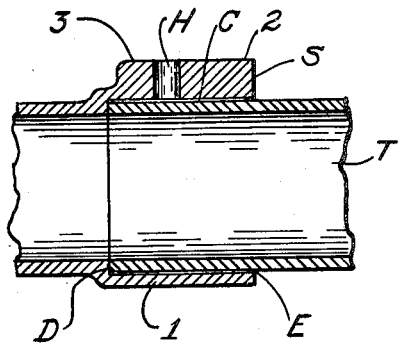
Figure 3:
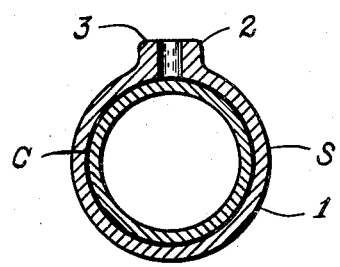
Figure 4:
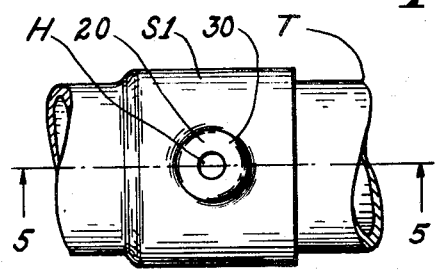
Figure 5:
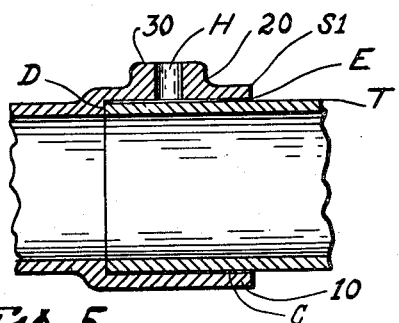
Figure 6:
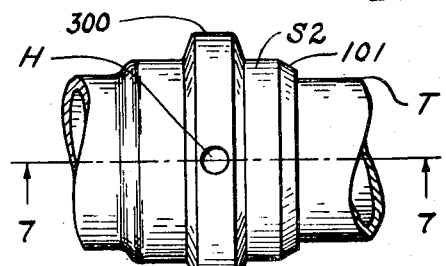
Figure 7:
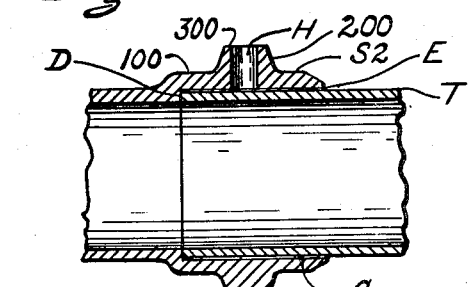

These and other objects will more fully appear from the following description of certain preferred and modified forms of my invention reference being had to the accompanying drawings in which Figure 1 is an elevation of the assembly of one form of the socket and adjacent part of a fitting embodying my invention along with the end of a tube disposed therein; Figure 2 is a longitudinal section taken along the line 2—2 of Figure 1, and Figure 3 is a transverse section taken along the line 3—3 of Figure 1. Figure 4 is an elevation of the assembly of another form of the socket and adjacent part of a fitting embodying my invention and a tube end disposed therein; Figure 5 is a longitudinal section taken along the line 5—5 of Figure 4. Figure 6 is an elevation of the assembly of another form of the socket and adjacent part of a fitting embodying my invention and a tube end disposed therein; Figure 7 is a longitudinal section taken along the line 7—7 of Figure 6.

For the sake of brevity I shall refer to solder as illustrative of various plastic bonding materials capable of being introduced into the capillary space of joints of the type to which this invention pertains, and illustrative of various kinds of solders, brazing materials and other substances with which the art is familiar. Similarly, for the sake of brevity, I will not again refer to the adaptability of the socket parts of my invention to T's, elbows, crosses, straight unions, adapters, valve bodies and the like, since these numerous dispositions and arrangements of prior socket parts in tube, pipe and other fittings and instrumentalities are well-known. While reference will be made especially to the joining of hollow cylindrical parts such as tubes or pipes with the socket parts of pipe or tube fittings, it will be understood that the teachings and precepts of my invention have application to the joining of parts which are not necessarily hollow or tube-like or are not necessarily circular in transverse section.

In the art of making capillary joints certain dilemma have heretofore persisted which I have solved with my invention. For example it has been known to be desired that the socket part of the joint and the member telescoped therein, which between them define the capillary space, should be at a temperature not greatly exceeding the temperature at which solder will melt quickly and be distributed rapidly and throughout the joint by capillary action. However the melting of the solder by taking heat from the parts that define the joint necessarily chills the parts and tends to reduce the temperature thereof below an efficient or effective temperature to melt the solder and/or thoroughly distribute the molten or fluid solder throughout the capillary space of the joint. On one hand it has been proposed to overcome this difficulty by merely increasing the mass especially of the socket part of the joint whereby to provide additional storage of heat, but the mere increase in the mass of the socket has not been a satisfactory solution, because of the resulting increase in cost and weight of the socket part and because a mere increase in mass while providing an increase in total heat capacity has not of itself brought heat to the right point at the right time to bring about the desired result. On the other hand the art has practiced without satisfaction the application of heat externally during the time of introducing solder to the capillary space but this practice has, even where the operator has extreme skill, always been accompanied by the hazard of having a hot spot at one point in the socket, as where the flame of the torch contacts such a spot, where the temperature may well militate against forming a proper bond because of "burning" the solder adjacent the hot spot, or at best, the complexity of the acts of feeding the solder while simultaneously seeking to apply a torch to maintain desired temperatures especially where the joint is being made in a position of awkwardness has been costly especially in time and in failure to make proper joints.

In the practice of my invention I provide that the mass of the socket part be different in different part of the wall of the socket and I apportion the greater mass with its greater heat content to the place where heat is required to be delivered most rapidly and/or to the place or places where the additional heat available from the greater mass will act most efficiently and directly in melting the solder on one hand, so that it may enter the capillary space, and in distributing the molten or fluid solder throughout the capillary space after its initial entry thereinto. By concentrating the storage and disposition of heat in parts of the socket wall in places and amounts substantially corresponding to the need and consumption thereof, I am able to improve greatly the feeding and distribution of solder into the capillary space, to avoid overheating the parts, to effect the act of forming the joint within a desirably narrow range of temperature change of the parts, i. e., at substantially an optimum temperature throughout the whole operation. Withal I avoid adding greatly or undesirably to the whole mass of the socket whilst improving in many instances the physical strength of the socket part in respect to its weight and cost and while greatly improving its thermal office and effect.

In the drawings I have shown merely the fragmentary portion of fitting that includes the socket part S of Figures 1–3, S1 of Figures 4 and 5, and S2 of Figures 6 and 7, the other familiar parts of the fittings whether T's, elbows or the like being omitted. To illustrate the instant invention all the several sockets S, S1 and S2 may be deemed to have substantially identical interior configurations, and receive in telescopic relation the end of similar tubes or member T to be joined to and within the respective sockets by solder introduced to the capillary space C between the exterior surface of the end of the tube and the adjacent interior surface of the respective sockets through the transverse feeding hole H. The capillary space C is shown in exaggerated thickness for the sake of illustration, and its relation to the hole H and the general body of the socket and the tube ends may be taken as much the same in each of the forms of my invention shown in the several figures of the drawings. In each of the several forms of my invention the sockets preferably terminate interiorly in annular shoulders D against which the ends of the tubes T may abut. The capillary space C may be defined, for the sake of present illustration, as extending cylindrically from the shoulders D to the circular open ends E of the sockets except where that space is interrupted by and opened to the inner end of the feeding hole H.

In the form of my invention illustrated in Figures 1–3 the major portion of the side wall 1 of the socket S is shown to be proportioned to be about as thick as the wall of the tube to be joined therewith, which by current standards is a thin walled socket, following the known practice that is not unusual particularly in the wrought type fittings which are frequently made from stock similar to the tube to be joined therewith. The feeding hole H, however, is located substantially in the middle of a thickened part 2 of and in the wall 1 of the socket S which, in the form shown in Figures 1–3, takes the form of a longitudinal rib preferably extending at its full height or thickness the full length of the socket as from a point opposite the shoulder D to the open end E of the socket, see Figures 2 and 3. The rib 2 may be two or three times the thickness of the wall 1 of the socket and integral therewith whereby to have correspondingly greater heat capacity but a much smaller radiating surface per unit of mass than the remaining part of the wall 1 of the socket. Preferably the top and other exposed surface 3 of the rib 2 is buffer or burnished to form a heat reflecting surface whereby to inhibit the dissipation of heat therefrom. The feeding hole H preferably has a diameter large enough to receive the end of the familiar solder rod or wire of common use, taken in sizes appropriately corresponding to the size of the fitting, as an ⅛" wire for a 1" fitting.

When it is desired to form a joint the parts are assembled in the teleccoping relation shown in the drawings and with due regard to cleanliness according to common practice heat is applied preferably to the socket wall 1, the rib 2 and the adjacent parts as by a torch or otherwise in the well-known manner. In the practice of my invention however it is preferable and advantageous to bring the temperature of the parts not to an excessively high degree, but rather to a degree but moderately higher than that which will first bring about the melting of the solder to be introduced to the capillary space C. Those skilled in the art will appreciate that consideration is commonly and advisedly given to the tightness of the fit of the telescoping parts, the size thereof and of the capillary space, and the time interval that may have to elapse, depending on the place and conditions of making the joint, between the heating of the parts and the introduction of solder to the hole H. The parts being thus properly cleaned, fluxed and heated, the solder rod or wire, for example, is inserted in the hole H where the heat stored in the rib 2 is abundantly available to induce the rapid melting of the solder and/or reducing its viscosity to the point where it "flashes" very quickly into and throughout the capillary space C. The concentration of heat in the rib 2 adjacent and around the feeding hole H has a cumulatively advantageous effect and result. Because the heat is stored closely adjacent the feed hole it flows in high rate and amount to the solder in the hole. The added length of the hole in its disposition in the rib increases the volume and mass of solder to which the heat from the rib may flow. The rapid melting and input of solder into the capillary space enhances the distribution of fluid solder throughout the space because it is supplied so rapidly that the wall 1 of the socket and other parts adjacent the capillary space, but remote from the rib 2, do not have time to lose their desired heat and temperature, as by radiation, conduction, etc., before the fluid solder flows to such parts of the joint. Thus the very speed of the intrdouction of the solder to the capillary space enhances the distribution thereof throughout the space, insures the filling thereof and the formation of a tight joint, and this same speed of operation, facilitated as it is by the concentration of heat at the feeding point, permits the use of desirably "low" temperatures throughout since the temperature of the parts need never be excessively high to compensate for the heat losses and time lags that invariably took place in the prior art devices and practices.

In the form of my invention shown in Figures 4 and 5 the wall 10 of the socket may be relatively thin, i. e., about as thin or a little thinner than present practice and similar to the wall 1 of the socket S of Figures 1-3 except in the form of the thickened portion or rib 20 thereof which takes a form resembling a torus rising from the wall 10 with the hole H as the circular aperture of the torus. Here again the raised rib 20 is preferably two or three times the thickness of the wall 10, and again I prefer that at least the top surface 30 of the torus-like rib 20 be polished to resist radiation therefrom. Thus heat stored in the rib or thickened part 20 is available for quick and direct delivery to the solder that is introduced into the hole H. The practice and mode of operation of the form of my invention shown in Figures 4 and 5 is similar to that of the form shown in Figures 1-3, assuming the mass and heat storage capacities of the ribs to be similar. The torus form of rib lends itself to better heat concentration geometrically and permits the concentration to be spaced inwardly away from the open end E of the socket.

In all events the rib 20 will deliver heat very quickly to the solder in the hole H to initiate and facilitate the feeding and distribution of solder at a rapid rate with the beneficent effects above more fully described.

In the form of my invention shown in Figures 6 and 7 the thickened portion 200 may take the form of an annular rib materially thicker than the balance of the wall 100 of the socket S2 at about the relative thickness illustrated in the drawings and mentioned above in comparing the thickness of the ribs 2 and 20 with the socket walls 1 and 10. Here also I prefer that at least the most readily accessible outer surface 300 of the rib 200 be polished to inhibit heat radiation therefrom. The rib 200 is pierced by one or more feeding holes H, but one being shown, whereby heat from the rib may flow rapidly, directly and effectively to solder or other bonding materials introduced to the capillary space through the hole H. In this form of my invention I also prefer that the thickness of the wall 100 adjacent to the open end E of the socket S2 be reduced as at 101 where, in the form shown, the end of the socket is externally chamfered. This chamfered portion of the wall of the socket adjacent the open end thereof being of reduced or decreasing thickness has a smaller heat capacity than the adjacent part of the wall 100 and a very much smaller heat capacity than that part of the wall of the socket that includes the rib 200.

In this form of my invention the rib facilitates the melting and introduction of the solder or other bonding material to the capillary space through the feed hole H in a manner similar to that above described, and the rib in its annular disposition about the socket tends, through its heat capacity, to expedite the annular distribution or flow of the fluid bonding material circumferentially. During the feeding and distribution of solder, the chamfered portion 101 having the least heat per unit of capillary space, tends to become a chilling zone inhibiting the egress of solder out of the capillary space at the open end E of the socket. By virtue of emphasizing the circumferential capillary flow more strongly than the longitudinal flow from the point of introduction at the hole H, the bonding material tends to complete its annular distribution before completing its longitudinal distribution. This tendency taken with the cooling effect of the chamfer 101 tends to bring about a very uniform distribution of the bonding material and a complete filling of the whole of the capillary space prior to and/or without loss from the capillary space of any bonding material out of the exposed edge thereof at the open end E of the socket.

The annular form of rib, disposed preferably about midway longitudinally of the socket, not only has the thermal office above discussed but also has the beneficent mechanical effect of strengthening the joint as against distortion from its desired cylindrical form either in the course of its manufacture or the handling, heating or use thereof. This form of rib, like the other forms, may be readily cast in the wall of the socket, if the fitting be made of the casting, or may perhaps be more easily formed in the wrought type of fitting by an up-setting operation performed with or in conjunction with the "sizing" of the socket.

Especially with the annular form of ribs, albeit not exclusive of other forms including those specifically described, it is also advantageous that the ribs are available and serve to conduct heat away from the point of application of heat to the socket during the heating thereof. Thus the flame of a heating torch may be brought to bear principally on one point on the rib of the socket without reduced hazard of warping or injuring the socket wall as might be the case if the flame were permitted to bear too long upon one part of a thin section thereof. The ribs, more effectively than the thin part of the wall, will transmit heat from the flame through the rib and thence to the adjacent parts of the socket wall with greater facility than could be obtained in the absence of such heat conducting and heat storing elements.

While I have shown in the specific illustrations merely one rib per socket and one feeding hole per rib I do not necessarily so limit my teaching. Those skilled in the art will appreciate within my invention that more than one rib may be advantageously provided for each socket in consideration of different sizes, strengths, shapes and materials of sockets to which my invention may be advantageously applied. The convenience or necessity of having more than one feeding hole in various forms of sockets and fittings and the facility with which more than one hole per rib or more than one apertured rib per socket may be provided will be apparent to those skilled in the art within the teachings hereof.

While I have illustrated and described a few different forms of ribs in particular relations to the walls of the sockets in which they are formed, other forms of ribs such as those shown in my copending applications will be recognized as adaptable to the practice of the instan invention having in mind in the instant invention that my preference is that the feeding holse be disposed centrally of the rib and remote from the open end of the socket. It will also be understood that the instant forms and relationships are illustrative and that other forms of ribs may have equally if not greater advantage in the various sizes, shapes and conditions of use to which my invention may be advantageously put. I am not aware that my invention is limited to or dependent upon the use of materials substantially different from those now commonly used in this art. My preference in materials merely goes to those in which the thermal and mechanical advantages of my invention can be realized most economically and abundantly.

While I have illustrated and described preferred forms and embodiments of my invention, modifications, changes and improvements therein will occur to those skilled in the art without departing from the precepts hereof, and I do not care to be limited in the scope of my patent to the forms herein specifically disclosed nor in any manner other than by the claims appended hereto.

I claim:

1. In a fitting for a capillary joint a socket part having a wall not substantially thicker than required for the mechanical strength of the joint, said wall having an internal surface adapted to define a capillary space with the juxtaposed surface of a member telescopically received therein, said socket part also having a raised external rib rising above the external surface of said wall a distance at least substantially equal to said wall thickness and overlying a part of said capillary space, at least the greater part of said rib being spaced away from the open end of the socket, said rib having a transverse opening extending therethrough and through said wall and communicating with said capillary space, said opening being adapted to receive a length of bonding material substantially equal to the thickness of the wall of the socket plus the thickness of the rib, whereby sufficient heat is made available to melt the bonding material in said opening and induce its capillary flow or flash from said opening in and through said space when the temperature of the socket wall and rib is but moderately in excess of the melting point of said bonding material.

2. A fitting for a capillary joint having a socket adapted to receive through the open end thereof a tube or member teelscopically with capillary space for bonding material between the interior surface of the wall of the socket and the exterior surface of the said tube or member, part of the said wall of the socket comprising at least one thickened portion, a greater part of the said wall of the socket including at least a portion of said wall near the said open end of the socket being substantially thinner than said thickened portion, said thickened portion having appreciably greater mass and heat capacity per unit of wall area than said thinner part of the wall, said thickened portion being pierced transversely with a feeding hole spaced from the said open end of the socket where bonding material may be fed through said thickened portion to said space.

3. The fitting of claim 2 in which the thickened portion of the wall of the socket takes the external form substantially of a torus rising from a side of the wall of the socket with said feeding hole disposed centrally thereof.

4. The fitting of claim 2 in which said thickened portion of the wall of the socket comprises a longitudinally disposed rib extending substantially the full length of the socket.

5. The fitting of claim 2 in which said thickened portion of the wall of the socket comprises an annular rib encompassing the socket.

PAUL D. WURZBURGER.

REFERENCES CITED

The following references are of record in the file of this patent:

UNITED STATES PATENTS

| Number | Name | Date |
|---|---|---|
| 1,931,666 | Lindquist | Oct. 24, 1933 |
| 2,084,207 | Lindquist | June 15, 1937 |
| 2,166,078 | Stephenson | July 11, 1939 |

FOREIGN PATENTS

| Number | Country | Date |
|---|---|---|
| 435,070 | Great Britain | Sept. 13, 1935 |
| 444,817 | Great Britain | Mar. 27, 1936 |